US006993630B1

(12) United States Patent
Williams et al.

(10) Patent No.: US 6,993,630 B1
(45) Date of Patent: *Jan. 31, 2006

(54) DATA PRE-FETCH SYSTEM AND METHOD FOR A CACHE MEMORY

(75) Inventors: James A. Williams, Mahtomedi, MN (US); Robert H. Andrighetti, Somerset, WI (US); Conrad S. Shimada, Oakdale, MN (US); Donald C. Englin, Shoreview, MN (US); Kelvin S. Vartti, Hugo, MN (US)

(73) Assignee: Unisys Corporation, Blue Bell, PA (US)

( * ) Notice: Subject to any disclaimer, the term of this patent is extended or adjusted under 35 U.S.C. 154(b) by 325 days.

This patent is subject to a terminal disclaimer.

(21) Appl. No.: 10/255,393

(22) Filed: Sep. 26, 2002

(51) Int. Cl.
*G06F 12/00* (2006.01)

(52) U.S. Cl. ...................................... 711/137; 711/118

(58) Field of Classification Search ................ 711/118, 711/137, 113, 114, 130, 161, 166; 712/207

See application file for complete search history.

(56) References Cited

U.S. PATENT DOCUMENTS

| | | | | |
|---|---|---|---|---|
| 6,006,307 A | * | 12/1999 | Cherukuri | 711/114 |
| 6,088,773 A | * | 7/2000 | Kano et al. | 711/161 |
| 6,230,241 B1 | * | 5/2001 | McKenney | 711/118 |
| 6,381,674 B2 | * | 4/2002 | DeKoning et al. | 711/113 |
| 6,601,153 B1 | * | 7/2003 | Engelbrecht et al. | 711/166 |
| 6,631,447 B1 | * | 10/2003 | Morioka et al. | 711/141 |
| 6,681,297 B2 | * | 1/2004 | Chauvel et al. | 711/130 |

* cited by examiner

*Primary Examiner*—Nasser Moazzami
(74) *Attorney, Agent, or Firm*—Beth L. McMahon; Charles A. Johnson; Mark T. Starr (57) ABSTRACT

A system and method for pre-fetching data signals is disclosed. According to one aspect of the invention, an Instruction Processor (IP) generates requests to access data signals within the cache. Predetermined ones of the requests are provided to pre-fetch control logic, which determines whether the data signals are available within the cache. If not, the data signals are retrieved from another memory within the data processing system, and are stored to the cache. According to one aspect, the rate at which pre-fetch requests are generated may be programmably selected to match the rate at which the associated requests to access the data signals are provided to the cache. In another embodiment, pre-fetch control logic receives information to generate pre-fetch requests using a dedicated interface coupling the pre-fetch control logic to the IP.

50 Claims, 5 Drawing Sheets

DATA PRE-FETCH SYSTEM AND METHOD FOR A CACHE MEMORY

RELATED APPLICATIONS

The following co-pending applications of common assignee have some subject matter in common with the current application:

Ser. No. 10/255,276 entitled "Delayed Leaky Write System and Method for a Cache Memory", filed on Sep. 26, 2002.

FIELD OF THE INVENTION

This invention relates generally to data processing systems, and more particularly to an improved system and method for pre-fetching data to be stored within a cache memory.

BACKGROUND OF THE INVENTION

It has been shown that the use of a small high-speed memory, often called a cache memory, positioned between an instruction processor and a much slower main memory tends to enhance performance of a data processing system. Instructions and data resident within the cache memory at the time of a requested access by the instruction processor are furnished much more quickly than those instructions and data that must be obtained from main memory.

To obtain maximum benefit from the use of a cache memory, it is desirable to anticipate which memory locations will be accessed by the instruction processor so that they may be preloaded into the cache memory. U.S. Pat. No. 3,806,888 issued to Brickman et al, shows an early data processing system employing a cache memory residing between the main memory and the instruction processor, or central processing unit. In this system, real memory is segmented into blocks or pages. If the instruction processor requests access to one data element of a block, the entire block is automatically transferred to the cache memory for subsequent use by the instruction processor. U.S. Pat. No. 4,225,922 issued to Porter attempts to improve upon the basic cache approach by segmenting the cache memory and by buffering cache commands. U.S. Pat. No. 4,354,232 issued to Ryan also buffers cache control commands.

The pre-fetching of data may be further complicated by variable length elements. U.S. Pat. No. 4,189,772 issued to Liptay attempts to address this problem by buffering the input to the cache memory. A decoder element is added by U.S. Pat. No. 4,437,149 issued to Pomerene et al, between the main memory and the cache memory to partially decode instructions before the cache memory is loaded.

The cache memory and cache controller are placed on the same substrate in U.S. Pat. No. 5,025,366 issued to Baror. U.S. Pat. No. 4,905,188 issued to Chuang et al, describes a chip design for optimization of the hardware construction.

A multiprocessor system is shown in U.S. Pat. No. 5,023,776 issued to Gregor. The individual instruction processors have dedicated cache memories. Shared cache memories are interposed between the dedicated cache memories and the main memory. Write buffers are employed in parallel with the shared caches. Multiple sequential writes bypass the shared cache and proceed directly to the main memory through the write buffers.

U.S. Pat. No. 5,423,016, issued to Tsuchiya et al., discloses a system that stores pre-fetched data elements in a block buffer before loading them into a cache memory. This load is accomplished beginning from the requested data element first such that as soon as the requested data element has been loaded into the block buffer, it is made available to the instruction processor. In this way, the instruction processor is permitted to execute subsequent instructions from cache memory, in parallel with loading of the remainder of the requested block of data into the block buffer. The instruction processor is able to obtain data from the cache memory because the cache memory is not busy storing the requested block.

U.S. Pat. No. 5,724,533 to Kuslak et al. discloses a method and apparatus for efficiently halting the operation of the instruction processor when a cache miss is detected. Generally, this is accomplished by preventing unwanted address incrementation of an instruction address pipeline and by providing a null instruction to an instruction pipeline when a cache miss is detected. The system is adapted to eliminate a recovery period after the cache miss is handled.

While the above-described systems undertake some of the performance issues associated with accessing cache memory, these systems do not address the unique problems associated with performing cache write operations in an efficient manner. To maintain memory coherency, write operations must generally be performed in an order in which associated instructions appear in the instruction stream. However, when one or more cache misses occur during sequential write operations, the data that is needed to allow the write operations to complete may not be loaded into the cache in an order that allows processing to continue in a manner that maintains memory coherency. This causes the processing of the write operations to stall until all memory data is loaded into the cache. As a result, system throughput is diminished.

Another issue that is not addressed by the foregoing systems involves the problem of diminished bandpass on the cache memory interfaces. In prior art systems, any pre-fetching of instructions and data is initiated over the primary address and data interfaces that are used to return instructions and data to requesting processor logic. As a result, the pre-fetch operations consume the interface bandwidth of the system and diminish throughput.

What is needed, therefore, is an improved system and method to perform pre-fetching of data within a data processing system in a manner that does not impact the bandpass of primary memory interfaces, and that addresses the unique problems associated with performing memory write operations.

SUMMARY OF THE INVENTION

The present invention provides a mechanism for pre-fetching data signals that overcomes many of the disadvantages associated with the prior art. According to one aspect of the invention, an Instruction Processor (IP) is coupled to a cache. When the IP generates requests to access data signals within the cache, some of the requests are provided to pre-fetch control logic. The pre-fetch control logic determines whether the data signals are available within the cache. If not, the data signals are retrieved from another memory within the data processing system, and are stored to the cache. If the associated request to access the data signals is provided to the cache after processing for the pre-fetch request has completed, the access request may be completed to the cache without resulting in a cache miss.

According to one aspect of the invention, multiple pre-fetch requests may be pending at once. When data is returned as a result of a pre-fetch request, the data may be stored to the cache without regard for the order in which the pre-fetch requests were issued.

In one embodiment, pre-fetch requests are provided to an interface that couples the cache to one or more other memories in the system. The rate at which these pre-fetch requests are provided to the interface may be programmably selected to match the rate at which the associated requests to access the data signals are provided to the cache. This throttles the pre-fetching logic so that a large time delay does not occur between the pre-fetch operation and a later data access. The chance that data will be fetched away by another processor within the system between completion of the pre-fetch operation and a later cache access is thereby minimized. In one embodiment, the inventive system is programmable so that the user may select the way in which requests are throttled.

According to another aspect of the invention, the rate at which pre-fetch requests are issued may further be based on the type of data access request that is associated with the pre-fetch operation. For example, pre-fetch requests that are associated with some block write operations do not need to be throttled, since these operations pre-fetch data that is unlikely to be needed by another processor in the system.

In one embodiment of the invention, the IP is coupled to the cache memory via a primary interface and an auxiliary interface. When an IP generates predetermined types of requests, some of the request data is provided over the auxiliary interface to pre-fetch control logic to initiate a pre-fetch operation. An associated request to access the data signals may be provided to the cache over the primary interface at substantially the same time.

According to another aspect of the invention, only predetermined types of requests are processed by pre-fetch control logic. In one embodiment, only write requests result in the initiation of pre-fetch operations. In another embodiment, a filter may be used to prevent certain requests from generating a pre-fetch request. For example, if two requests to the same address are received sequentially, only the first request results in initiation of a pre-fetch operation. In another embodiment, the filter operates only if the two requests are received sequentially within a predetermined time period. According to yet another embodiment, the filter is programmable to select the mode of operation, and to further select the time delay between requests.

According to one aspect of the invention, a system for utilizing a cache memory is described. The system includes a primary interface coupling the IP to the cache memory to provide requests from the IP to the cache memory. The system further includes an auxiliary interface coupling the IP to the cache memory to provide an address to the cache memory, whereby a pre-fetch operation may be initiated to obtain data signals identified by the address if the data signals are not stored in the cache memory.

According to another aspect of the invention, a method of utilizing a cache memory is disclosed. The method includes providing an address from an IP to the cache via an auxiliary interface to determine whether addressed data is resident in the cache. The method further comprises providing an request from the IP via a primary interface to access the cache.

In one embodiment, a system for processing requests within a data processing system is provided. The system includes a decode circuit within an IP for generating requests that include addresses. The system further includes pre-fetch logic coupled to the decode circuit to determine whether predetermined ones of the addresses are resident within the cache memory. Request interface logic that is coupled to the pre-fetch logic is provided to obtain data addressed by each of the predetermined ones of the addresses if the data is not resident within the cache memory. Cache control logic is coupled to the request interface logic to write obtained data to the cache memory irrespective of the order in which the requests were generated.

According to yet another aspect of the invention, a method of utilizing a cache memory is described. The method includes the steps of generating one or more requests to access the cache memory, wherein each request includes an address. The method further includes scheduling the requests for processing by the cache memory. Independently of the scheduling step, it is determined whether ones of the addresses are resident within the cache memory. For each address that is not resident within the cache memory, the addressed data signals are obtained and stored in the cache memory.

Other scopes, aspects, and embodiments of the current invention will become apparent from the following description and the accompanying drawings.

DETAILED DESCRIPTION OF THE DRAWINGS

Figure 1:
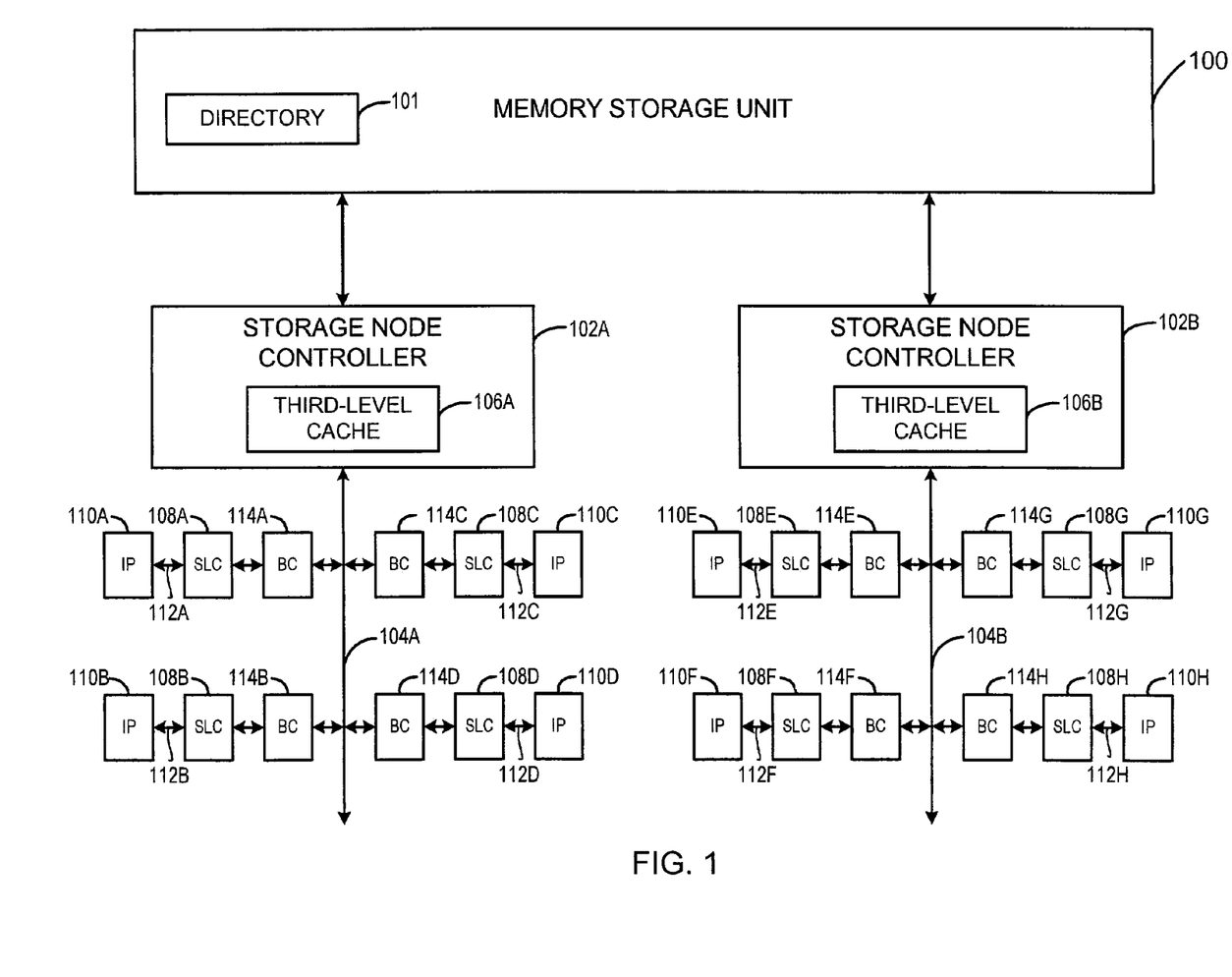
FIG. 1 is a block diagram of an exemplary data processing system of the type that may employ the current invention.

FIG. 1 is a block diagram of an exemplary data processing system that may employ the current invention. The system includes a memory storage unit (MSU) 100 that provides the main memory facility for the system. MSU 100 may include random access memory (RAM), read-only memory (ROM), and any other type of memory known in the art. MSU 100 may be subdivided into multiple subunits (not shown) in a manner largely beyond the scope of the current invention.

In one embodiment, MSU is a directory-based storage unit similar to the system described in commonly-assigned U.S. Pat. No. 6,587,931 issued Jul. 1, 2003 to Bauman et al. entitled "Directory Based Cache Coherency System Supporting Multiple Instruction Processor and Input/Output Caches", incorporated herein by reference. In this embodiment, MSU retains information in directory 101 that indicates where the latest copy of requested data resides within the system. This is necessary since data from MSU 100 may be copied into any of the various cache memories within the system. Directory 101 tracks the latest copy of the data to ensure that every processor is operating from this copy. In the current embodiment, directory 101 includes a directory entry that tracks the location of each 128-byte block of memory within the MSU, where a 128-byte block is referred to as a cache line.

MSU is coupled to one or more Storage Node Controllers (SNCs) shown as SNCs 102A and 102B. The system of the current invention may include more or fewer SNCs than are shown in FIG. 1. Each SNC is coupled to MSU 100 over one or more high-speed MSU interfaces that each includes data, address, and function lines. For simplicity, each SNC is shown coupled to MSU 100 over a single interface.

Each SNC includes logic to interface to the high-speed MSU interface, and further includes logic to interface to a respective processor bus such as processor buses 104A and 104B. These processor buses can employ any type of bus protocol. Each SNC may further include a respective cache and all supporting logic. This cache may be a Third-Level Cache (TLC), a Fourth-Level Cache (4LC), or some other type of cache memory. In the embodiment shown, SNCs 102A and 102B include TLCs 106A and 106B, respectively.

As noted above, each of SNCs 102A and 102B is coupled to a respective processor bus 104A and 104B. Each processor bus further couples to multiple local cache memories through respective Bus Controllers (BCs). Each BC controls the transfer of data to and from the processor bus in a manner that conforms to bus protocol. In the current embodiment, Second-Level Caches (SLCs) 108A–108D are coupled to processor bus 104A through BCs 114A–114D, respectively. Similarly, SLCs 108E–108H are coupled to processor bus 104B through BCs 114E–114H, respectively. In another embodiment, these local caches may be Third-Level Caches.

Each SLC 108 is also coupled to a respective one of the Instruction Processors (IPs) 110A–110H over a respective interface 112A–112H. For example, SLC 108A is coupled to IP 110A via interface 112A, SLC 108B is coupled to IP 110B via interface 112B, and so on. An IP may be any type of processor such as a 2200™ processor commercially available from Unisys Corporation, a processor commercially available from Intel Corporation, or any other processor known in the art. Each IP may include one or more on-board caches. In the current embodiment, each IP includes a First-Level Cache (FLC). Preferably, each IP resides on a single Application Specific Integrated Circuit (ASIC) device with a respective SLC 108. Alternatively, an IP may be coupled to a respective SLC over an external interface. The associated BC may or may not be integrated with the SLC logic, and may also reside within the same ASIC.

An SNC, its respective processor bus, and the entities coupled to the processor bus may be referred to as a "processing node". In the current example, SNC 102A, processor bus 104A, and all entities associated with processor bus including BCs 114A–114D, SLCs 108A–108D, and IPs 110A–110D may be referred to as a processing node. Similarly, SNC 102B, processor bus 104B, and all entities associated with processor bus 104B comprise a second node.

During execution, an IP is accessing programmed instructions and data from MSU 100 and its respective caches. For example, when IP 110A requires access to a memory address, it first attempts to retrieve this address from its internal cache(s) such as an FLC. If the requested address is not resident in the FLC, a request is sent to the respective SLC 108A. If the requested data is likewise not resident within the SLC, the SLC forwards the request to the processor bus 104A.

In one embodiment, all SLCs on a processor bus implement a snoop protocol to monitor, or "snoop", the processor bus for requests. In the current example, SLCs 108B–108D snoop the request provided by SLC 108A on processor bus 104A. If any of these SLCs stores the requested data, it will be returned to requesting SLC 108A via processor bus 104A. Additionally, SLCs 108B–108D may have to invalidate any stored copies of the data depending on the type of request made by SLC 108A. This is discussed further below.

SNC 102A also snoops the request from SLC 108A. SNC 102A determines whether TLC 106A stores the most recent copy of the requested data. If so, the data will be provided by SNC 102A to the SLC 108A.

In some instances, data requested by IP 102A is not resident within any of the cache memories associated with processor bus 104A. In that case, SNC 102A must forward the request to MSU 100. MSU 100 determines the location of the current copy of the requested data using information stored within its directory 101. The most current copy may reside within the MSU itself, or may reside within a cache memory that is associated within one or more other nodes in the system, as indicated by state bits within directory 101. In the former case, the MSU provides the data directly to SNC 102A. In the latter case, the MSU must issue a "return" command to these other node(s) requesting that the data be returned to MSU 100 so that it may be forwarded to SNC 102A.

In the current example, it will be assumed that the requested data is retained by SNC 102B. Therefore, MSU issues a request to SNC 102B to prompt return of the data. Assume further that SNC 102B determines, based on stored state bits, that SLC 108E stores a valid copy of the cache line that has been modified. SNC 102B therefore issues a request on processor bus 104B for return of the modified data. SLC 108E, which is snooping bus 104B, intercepts the request and responds by returning the data to SNC 102B. In some instances, SLC 108E may retain a read-only copy of the returned data, and in other cases, SLC 108E must invalidate its copy. For example, a read-only copy may be retained if IP 110A is requesting a read-only copy. If the data is being requested for update purposes, however, SLC 108E must invalidate its copy. These details are largely beyond the scope of the current invention and are not discussed in detail. Additional information regarding a directory-based coherency scheme for use in a multiprocessor platform is discussed in the commonly assigned U.S. patent application entitled "Directory Based Cache Coherency System Supporting Multiple Instruction Processor and Input/Output Caches" referenced above.

After SNC 102B obtains the requested data, that data is forwarded to MSU 100, which then provides it to SNC 102A. MSU 100 further updates directory 101 so that the location of the most up-to-date copy of the data is recorded. SNC 102A provides the data to requesting IP 110A via SLC 108A so that execution may continue.

In the system of the current embodiment, data is retrieved from, and written to, MSU 100 in cache lines, where a cache line of the current embodiment is defined as 128 contiguous bytes of memory. A cache line having any other size may be selected in the alternative. As discussed above, directory 101 records directory information on a cache-line basis. The various caches within the system also track memory on a cache-line basis.

It will be understood that the data processing system of FIG. 1 is merely exemplary. That system may include more or fewer SNCs, SLCs, and/or IPs. Additionally, many other types of system architectures may usefully employ the current invention as will be apparent from the following discussion.

As will be appreciated by the description set forth above, when a cache miss occurs to a processor's FLC or SLC, obtaining the requested data may be time-consuming. This is particularly true if the data must be retrieved from MSU 100 or from another node within the system. To reduce the latency associated with data retrieval following a cache miss, some systems implement a pre-fetching mechanism, as discussed above. The system retrieves data from the main memory, if necessary, in anticipation of requiring that data for a read or write operation. When that operation finally occurs, the data will already reside within the processor's FLC or SLC so that latency is minimized.

Figure 2:
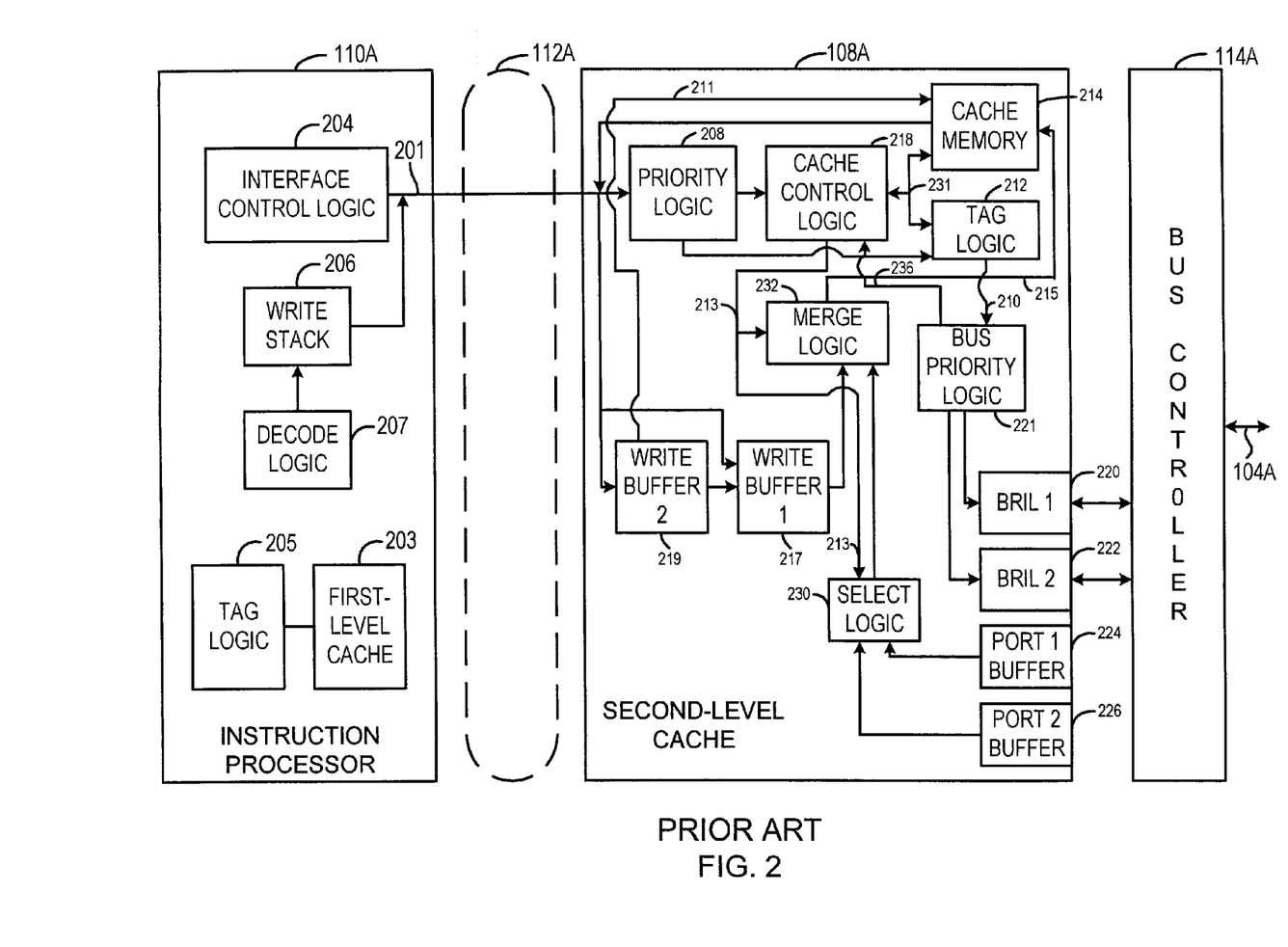
FIG. 2 is a block diagram of an exemplary prior art system for pre-fetching data.

FIG. 2 is a block diagram of an exemplary prior art system for pre-fetching data. This pre-fetching system is shown within a data processing platform similar to that of FIG. 1. IP 110A is coupled via interface 112A (shown dashed) to SLC 108A. Interface 112A includes a primary interface 201, that supports data transfers between IP 110A and the SLC 108A for read and write operations. In one embodiment, the primary interface consists of an independent instruction read port having address and data lines, and an operand port that supports operand read and write requests (not individually shown). The operand port includes address and function signals, and independent read and write data paths.

IP 110A includes a First-Level Cache (FLC) 203 coupled to tag logic 205. In the current embodiment, FLC is a store-through, set associative cache that stores both instructions and operands on a cache line basis. The addresses of the cache lines stored within FLC are recorded by tag logic 205. When a cache miss occurs to FLC 203, the requested cache line is retrieved from SLC 108A, or from one of the other memories within the system via primary interface 201.

IP 110A further includes a write stack 206 to store pending write operations. In the current embodiment, when IP decode logic 207 decodes an instruction that involves an operand write operation, the write operation is completed to FLC 203. Additionally, because FLC 203 is a store-through cache, the write request is stored within write stack 206 for presentation to SLC 108A. In another embodiment, other types of instructions, including read operations, may cause the entry of a respective request into a stack similar to write stack 206.

In one embodiment, write stack 206 stores up to sixteen requests. Each request includes an address, data, and a function code indicating request type. The capacity of write stack 206 may be increased or decreased in another embodiment. After the write request address and data is stored within write stack 206, the IP may continue instruction execution as if the write request were completed to the SLC. This increases system throughput because the IP is not stalled waiting for the SLC to complete the request.

Interface control logic 204 controls the presentation of write requests onto primary interface 201. When SLC 108A is ready to receive another write request, an acknowledge signal is provided by SLC 108A over primary interface 201. Interface control logic 204 retrieves a request address and write data from the top of write stack 206 and provides this information to priority logic 208 within SLC 108A. The write data is stored within write buffer 2, 219. In one embodiment, the write data will also be loaded substantially simultaneously into write buffer 1, 217 if write buffer 1 is available. Priority logic then schedules the request for presentation to tag logic 212. Tag logic determines whether the cache line containing the requested address resides within cache memory 214. If so, the request is completed by storing the write data from write buffer 2, 219 to the cache via data path 211. If, however, the cache line is not resident within cache memory 214, SLC 108A provides an early acknowledge signal on interface 201 to interface control logic 204. This allows interface control logic to retrieve the next write request to be provided over primary interface 201 to priority logic 208.

When a cache miss occurs, this cache state is indicated to cache control logic 218 on lines 231, and is further provided to bus priority logic 221 on lines 210. When bus priority logic 221 receives this status, bus priority logic 221 generates a request to obtain the cache line. This request is scheduled for presentation to processor bus 104A via BC 114A. When the request gains priority, it will be stored to one of the bus ports shown as Bus Request Input Logic 1 (BRIL1) port 220 or Bus Request Input Logic 2 (BRIL2) port 222, depending on which is available for use. These ports are used to initiate write, pre-fetch, and certain types of read requests, with other ports (not shown) being provided to initiate some higher priority read requests. The initiation of the read request is largely beyond the scope of this application. Each of BRIL1 and BRIL2 ports may store a single request. If both BRIL1 and BRIL2 ports are available to store a request, BRIL1 port will receive the request. It will be assumed for the current example that the pre-fetch request is stored to BRIL1 and no other requests are pending.

The request from BRIL1 port 220 is provided to BC 114A, which formats the request and issues it to processor bus 104A. The requested data may be returned to SLC 108A by SNC 102A or one of SLCs 108B–108D residing on processor bus 104A. Otherwise, the request may be provided to MSU 100. In that case, the MSU may provide the latest copy of the requested cache line directly. If, however, another node within the system stores the most recent cache line data, that node must return the data to MSU 100 to be routed to the requester. In any case, the cache line will eventually be returned to SLC 108A as discussed above, and will be stored within a corresponding one of the port buffers shown as port 1 buffer 224 and port 2 buffer 226. Since the request of the current example is stored in BRIL1 port 220, the returned cache line data is stored within port 1 buffer 224. For a request that is stored within BRIL2 port 222, returned data is stored within port 2 buffer 226.

After data associated with the request from BRIL1 port 220 is stored within port 1 buffer 224, bus priority logic 221 generates a signal on line 236 to cache control logic 218 to indicate that the returned cache line is available, and to further indicate which one of the write buffers contains the data. In response, cache control logic 218 generates signals on line 213 to cause select logic 230 to select the data from the appropriate buffer, which in the current example is port 1 buffer 224. The selected data is provided to merge logic 232, which performs a merge operation that combines this data with the updated portions of the cache line that are stored within write buffer 1, 217. The modified cache line data is then written to cache memory 214 on interface 215.

The foregoing describes the manner in which a single pending write request is completed by SLC 108A following a cache miss. Assume further that in the above example another request is received while the first request is pending within BRIL1 port 220. The write data associated with this request is stored in write buffer 2, 219. If a cache miss occurs for this additional request, bus priority logic 221 responds by generating a request for presentation to processor bus 104A, as discussed above. When this request gains priority, it will be provided to an available one of BRIL1 port 220 or BRIL2 port 222.

For purposes of the current example, it will be assumed this subsequent request gains priority and is stored within BRIL2 port 222 while the previously issued request is still pending within BRIL1 port 220. Eventually, this second request will be completed in the manner discussed above so that the requested cache line data is stored within port 2 buffer 226. This data may be received by SLC 108A before the data that is associated with the previously issued request is received. If this is the case, the write operation associated with this second request may not be performed until the data associated with the first write request has been written to the cache memory. This requirement must be enforced so that out-of-order transaction processing does not create memory errors. As an example, assume that a first processor updates data residing within a shared memory area. The updated data is used as a flag to indicate that other associated shared data has been stored within the shared memory area and is available for processing. If out-of-order write operations are allowed, a flag could be set before the shared data is actually available, resulting in errors. Other types of unintended consequences could result if out-of-order write operations are permitted.

Returning to the current example, when data is received for the first-issued request, it is merged with data stored within write buffer 1, 217, as previously described. The updated cache line is then written to cache memory 214. After this first request is completed, updated data from the subsequent request that is stored within write buffer 2, 219 is transferred to write buffer 1, 217. The cache line stored in port 2 buffer 226 is selected by select logic 230, and merge logic 232 merges the updated data from write buffer 1, 219 with the cache line data. The data is written to cache memory 214 on interface 215 under the direction of cache control logic 218 to complete the second request.

Several observations may be made regarding the prior art design. First, as discussed above, write data must be stored to cache memory in the order in which write requests were issued. As a result, BRIL1 port 220 or BRIL2 port 222 may be stalled after the return of requested data. The stalled port cannot be used to issue another request until data for a previously issued request is returned and written to cache memory 214. This results in diminished throughput. Additionally, when two requests are pending to the same cache line, one port remains unused waiting for completion of the first request. This also decreases the bandwidth of the system.

Figure 3:
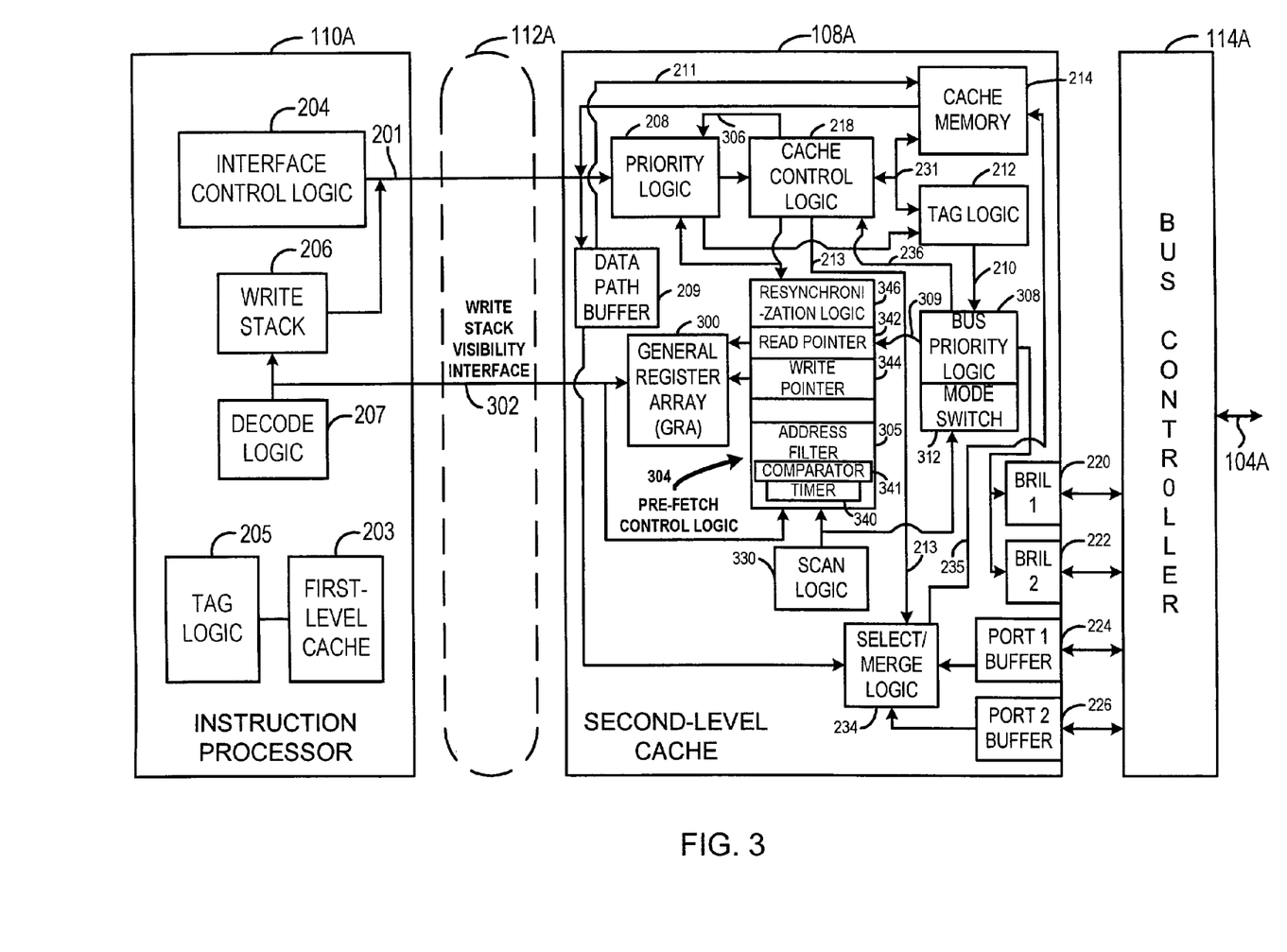
FIG. 3 is a block diagram of one embodiment of the current invention.

FIG. 3 is a block diagram of one embodiment of the current invention, which solves the foregoing problems. Elements that are similar to those discussed above with respect to FIG. 2 are labeled with like numeric designators. The current invention includes IP 110A having tag logic 205 coupled to FLC 203. The system includes primary interface 201 to couple interface control logic 204 to SLC 108A. IP 110A further includes decode logic 207 to decode machine instructions. When decode logic decodes an instruction that requires an operand write operation, the address and data for that request are stored in write stack 206 in the manner discussed above. In another embodiment, a similar stack could be provided to store other types of instructions to be processed in a manner similar to the described below with respect to the write instructions. In still another embodiment, the types of instructions stored within write stack 206 could be programmably controlled so that pre-fetch processing is performed for selectable types of instructions that include instructions other than write operations.

Unlike the prior art design described above in reference to FIG. 2, the current invention includes a dedicated Write Stack Visibility (WSV) interface 302 coupling write stack 206 to SLC 108A. When decode logic 207 stores address, data, and function code signals into write stack 206, the address and function code signals are also provided over WSV interface 302 to SLC 108A. These signals are stored in a storage device shown as General Register Array (GRA) 300, although any other type of storage device may be used in the alternative. In one embodiment, a leaky designator is also stored into GRA 300. The use of leaky designator is largely beyond the scope of the current invention, and is described in commonly assigned patent application entitled "Delayed Leaky Write System and Method for a Cache Memory" referenced above.

In one embodiment, GRA 300 includes sixty-four storage locations, each being fifty bits wide, although other sizes may be employed in an alternative embodiment. GRA may be used as a circular queue, such that requests are stored to sequential addressable locations within the GRA as they are received. When a request is written to the last storage location within GRA 300, the next request will be stored within the first location, if available, and so on.

GRA 300 is coupled to pre-fetch control logic 304. Pre-fetch control logic maintains a write pointer 344 that indicates which storage location within GRA 300 will be used to store the next request. Pre-fetch control logic 304 further controls the storing of this request within the GRA. Pre-fetch control logic may include an address filter 305 to control which write request addresses will be stored within GRA 300, as will be discussed further below. Address filter 305 may include a timer 340 and a comparator 341.

Pre-fetch control logic 304 performs pre-fetch processing on the requests that are stored within GRA 300. Pre-fetch control logic maintains a read pointer 342 that points to the oldest request within GRA 300 that has yet to undergo pre-fetch processing. When pre-fetch processing is completed on a previous request, pre-fetch control logic 304 retrieves the request that is indicated by read pointer 342, and provides this request to priority logic 208. Priority logic 208 schedules this request for presentation to tag logic 212, which determines whether the requested address is resident within cache memory. If not, the cache miss status is communicated to bus priority logic 308 on line 210 so that bus priority logic may generate a pre-fetch request to obtain the cache line. When the request gains priority, the pre-fetch request is written to the available one of BRIL1 port 220 or BRIL 2 port 222, and is presented to processor bus 104A via BC 114A. The request is fulfilled when the requested cache line is returned to either port 1 buffer 224 or port 2 buffer 226 as discussed above, depending on whether BRIL1 port 220 or BRIL2 port 222 initiated the request.

When the data is available within the port buffer, bus priority logic 308 provides a packet of request information on interface 309 to pre-fetch control logic 304. This packet of information includes the original request address and an indication as to which port stores the returned data. Pre-fetch control logic 304 responds by generating a cache replacement request to priority logic 208, which schedules the request for processing. Pre-fetch control logic 304 also provides an indication to cache control logic 218 regarding the location of the returned data. When the cache replacement request gains priority, cache control logic 218 provides control signals on line 213 to direct select/merge logic 234 to select the returned data from the appropriate one of port 1 buffer 224 or port 2 buffer 226. The selected data is stored to cache memory 214 over interface 235 under the direction of cache control logic 218. It will be noted that in this scenario, select/merge logic 234 does not perform any type of merge operation on the cache line data. Merge operations will be discussed below in regards to other scenarios.

The foregoing description assumes that the pre-fetch operation is completed before the initiation of an associated write request over primary interface 201. In this case, the associated write request remains stored within write stack 206 until after the cache line associated with the write request is stored within cache memory 214. When this write request gains priority, it is presented by interface control logic 204 to priority logic 208 over primary interface 201.

The write data for the request is stored within data path buffer 209, and the request is then queued waiting for availability of tag logic 212. When the write request is provided to tag logic 212, a cache hit will result because the cache line was already retrieved, if necessary, by the pre-fetch operation described above. Additionally, this pre-fetch operation acquired the access privileges that are required to allow the write operation to complete. In the current embodiment, the pre-fetch operation acquires the cache line with "exclusive ownership" privileges, meaning that the copy of the cache line stored within cache memory 214 is an exclusive copy that may be updated within cache memory 214. Because the data is resident in cache memory with the appropriate exclusive ownership privileges, the data from data path buffer 209 may be transferred over data path 211 to cache memory 214 so that the write operation is completed.

As previously noted, the foregoing scenario involves the case wherein the pre-fetch operation is completed before SLC 108A receives the associated write request, and a cache hit results. In another instance, the issuing of the write request may result in a cache miss because a previously issued pre-fetch request has not yet completed. Bus priority logic 308 is alerted of the cache miss via control signals from tag logic 212 provided on lines 210. In this case, request processing will depend on whether some of the requested data has already been stored within either port 1 buffer 224 or port 2 buffer 226. If some data has already been stored within one of the port buffers, the replacement operation may be completed in the manner described above. That is, bus priority logic 308 provides a packet of information on line 309 to pre-fetch control logic 304 that includes the request address for the returned data. In response, pre-fetch control logic 304 generates a replacement request to priority logic 208, which schedules this request for completion by cache control logic 218 and tag logic 212. When the replacement request gains priority, cache control logic 218 causes select/merge logic 234 to select data from either the port 1 or port 2 buffer. This data is written to cache memory 214 via interface 235.

When bus priority logic 308 determines that the cache replacement operation is underway and will be completed within a predictable time frame, bus priority logic signals cache control logic 218 to convert the pending write request that was received over primary interface 201 to a "stack" request. A stack request is a special request type that is used when a original request could not be processed because of a memory conflict. In response, cache control logic 218 provides a signal to priority logic 208 via interface 306 indicating that the write request should be re-issued as a stack request. Priority logic 208, which buffered the original request information in case a stack request was required, uses the stored information to issue the stack request. When the request gains priority, it is presented to tag logic 212, where it results in a cache hit. The write data stored in data path buffer 209 may then be written via data path 211 to cache memory 214 so that the operation is completed.

In still another scenario, a pre-fetch request is pending within BRIL1 220 or BRIL2 222 when the associated write request is received on primary interface 201, and a cache miss results. Unlike the previous case, however, the pre-fetch request has not progressed to the point that data is available. When data is returned to either port 1 buffer 224 or port 2 buffer 226, bus priority logic 308 signals cache control logic 218 of the availability and location of the data, and indicates that an "operand write replace" operation is to be performed to cache memory 214. In response, cache control logic 218 provides control signals on line 213 to select/merge logic 234. These signals select the returned cache line, and merge the write data from data path buffer 209 with this cache line. The updated cache line is written to memory on interface 235, and the operation is completed.

As described above, any request for data that is made to processor bus 104A results in return of a 16-word cache line. In one embodiment of the invention, bus priority logic 308 generates the requests to include an indication of the order in which the data words are to be returned on processor bus 104A to the SLC 108A. For any request type that is associated with data modification such as a write request or an associated pre-fetch request, bus priority logic 308 generates a request that indicates that the portion of the cache line that is to be modified should be returned first. This simplifies the above-described merge operation, since it can always be performed to that first-returned data portion.

Although in many cases, a pre-fetch request is presented across WSV interface 302 before the associated write request is presented across primary interface 201, this is not always the case. For example, when a request is stored to an otherwise empty write stack 206, the write request will be provided via primary interface 201 at substantially the same time the request address is provided over WSV interface 302. Because the processing of pre-fetch requests are considered background tasks that are not granted high priority by priority logic 208, priority logic will grant higher priority to the write request, which will be scheduled first for presentation to tag logic 212. If this write request results in a cache miss, it is scheduled to processor bus 104A by bus priority logic 308. When bus priority logic later sees the cache miss that results from the associated pre-fetch request, bus priority logic provides a "resume" signal on line 309. As a result, pre-fetch control logic 304 increments read pointer 342 to continue pre-fetch processing with the next request that is stored within GRA 300. The previous pre-fetch request is considered complete.

Still other situations exist wherein a write request presented to tag logic 212 results in a cache miss. For example, a pre-fetch request may have been processed so that a cache line is obtained and written to cache memory 214. Later, a request for this cache line is driven onto processor bus 104A by one of SLCs 108B–108D or SNC 102A before the write request for the data is received by SLC 108A. SLC 108A relinquishes the cache line in response to the request. When the write request is finally processed, a cache miss occurs because the cache line was already "snooped away" by the previous processor bus request. In response, bus priority logic 308 schedules a request to the processor bus. The request is completed using an available one of BRIL1 220 or BRIL2 222 as described above. When the cache line is returned, the cache line data is merged with the write data from data path buffer 209, and the updated cache line is written to cache memory 214.

The above-described problem may be addressed by minimizing the delay between the pre-fetching of a cache line and the time an associated write request is processed. This effectively reduces the window during which a cache line may be snooped away from cache memory 214. In one embodiment, this is accomplished by throttling the pre-fetch requests that are issued over BRIL 1 port 220 or BRIL 2 port 222. For example, assume a cache line is received as the result of a request that is stored within BRIL1 port 220. Further assume that bus priority logic 308 has not detected the processing of the associated write request over line 210. Bus priority logic 308 may execute in a mode wherein another request will not be issued to BRIL1 port 220 until the associated write request is detected. When this mode is activated, the number of pre-fetch requests that can be processed before a corresponding write request is presented over primary interface 201 is limited to "one". In one embodiment, bus priority logic 308 includes a programmable mode switch 312 to control selection of this mode.

In another embodiment, pre-fetching may be ahead of the issuing of write requests by a multiple number of requests. In this embodiment, WSV interface 302 provides pre-fetch control logic 304 with visibility to a pointer that controls which request will next be processed by interface control logic 204 for presentation over primary interface 201. Pre-fetch control logic uses comparator 341 to maintain request processing a programmable number of requests ahead of the processing performed by interface control logic. This mode thereby loosely correlates the rate of issuing pre-fetch requests to the rate at which the write requests are received over primary interface 201. Programming of pre-fetch control logic may be performed under the control of scan-set logic 330.

In some instances, it is undesirable to throttle the issuing of pre-fetch requests in any of the ways discussed above. This is particularly true when the IP is performing large block write operations such as occur when the IP is initializing large buffers containing multiple cache lines. In this case, it is unlikely another processor requires access to, or will snoop away, any of the cache lines that are being initialized. Therefore, it is desirable to allow pre-fetch control logic 304 to run in an un-throttled mode so that pre-fetch control logic can "get ahead" of the write request processing. Thus, according to one aspect of the invention, throttling of requests in any of the ways discussed above is only enabled when a partial write operation is being performed such that not all words of the cache line are being updated. If all words of the cache line are being updated, as would occur during a block write operation, bus request logic 308 does not throttle requests. Pre-fetch control logic 304 is allowed to continue pre-fetch processing without regard to the rate at which write requests are being provided over primary interface 201. Pre-fetch control logic 304 determines the type of operation being performed using the function code signals provided with each address on WSV interface 302. This allows the selective throttling of pre-fetch processing to occur in the manner discussed above.

In still another embodiment, the issuing of pre-fetch requests takes into account the assertion of a retry signal that is received by bus priority logic 308 from processor bus 104A. A retry signal is raised by processor bus 104A when a request is issued on the processor bus for a cache line that was recently requested by another entity within the same processing node. This signal, which is provided to bus priority logic 308, indicates that the request must be retried at a later time. This retry functionality is designed to prevent a situation wherein SLC 108A snoops away a cache line that was recently acquired by another cache in the processing node. If the other cache has not completed all operations to the cache line when SLC 108A snoops away the cache line, the other cache will be forced to re-acquire that cache line at a later time. This creates memory thrashing. The retry function is designed to create a delay that allows the other cache to complete processing before SLC 108A generates a request to obtain the cache line.

The current invention uses the retry signal to throttle the issuing of pre-fetch requests. When bus priority logic 308 receives a retry indication from processor bus 104A, a pending pre-fetch request that resulted in the assertion of the retry signal will remain pending in either BRIL1 port 220 or BRIL2 port 222. This request will not be retried until the associated write request is received across primary interface 201. When the write request is detected, bus priority logic 308 will cause the pre-fetch request to be reissued via BC 114A to processor bus. The pre-fetch and write requests will then be completed in the manner discussed above.

In another embodiment, each of BRIL1 port 220 and BRIL2 port 222 may be individually enabled to accept pre-fetch requests. When pre-fetching is disabled, a write request is received by this logic only after a request that is provided over primary interface 201 results in a cache miss. If desired, any one of BRIL1 220 and BRIL2 222 may be enabled to accept pre-fetch requests, with the other port being reserved solely for write requests provided via primary interface 201. This provides another mechanism to limit the time between the pre-fetching of a cache line and the time that a write request is completed to cache memory 214.

Another aspect of the current invention involves address filter 305, which is included in pre-fetch control logic 304. This filter prevents certain write addresses from being stored within GRA 300. In one embodiment, a request address is not stored within GRA 300 if comparator 341 matches the address to the address that was most recently stored within GRA 300. As a result, only a single GRA entry is created when a sequence of write requests to the same cache line is encountered, so that only a single pre-fetch operation for the cache line is initiated. In another embodiment, the filter may be designed so that only one request to the same cache line is stored within GRA 300 at a given time, regardless of whether the requests to the same cache line are time-sequential.

Address filter provides important benefits over prior art designs because it prevents two requests for the same cache line to be pending simultaneously to processor bus 104A. Some bus protocols, such as the one employed in the exemplary embodiment by processor bus 104A, dictate that two requests for the same cache line may not be pending simultaneously on the bus. To conform to this protocol, when two sequential pre-fetch requests are processed, the second request cannot be issued on processor bus 104A. Some prior art systems handle this situation by temporarily storing the second request within an unused one of the bus request ports, which in the current system include BRIL1 port 220 and BRIL2 port 222. When this occurs, the port cannot be used for any other requests, decreasing throughput. When address filter is used, this problem is eliminated, since GRA 300 will not store sequential pre-fetch requests to the same address.

In still another embodiment, address filter 305 includes a timer 340. The timer is used to filter out sequential requests to the same cache line only if the requests are not separated by a predetermined time period. If more than the predetermined time span separates the receipt of the sequential requests, another entry in GRA 300 will be created for the second request even though it is directed to the same cache line as the previously received request. In this latter case, enough time has elapsed so that it is considered necessary to perform the pre-fetch operation a second time. This ensures that the target cache line has not been snooped away by a request presented on processor bus 104A. Timer 340 is programmable by scan logic 330 to allow for selection of the predetermined value.

According to still another aspect of the invention, pre-fetch control logic 304 does not create entries within GRA 300 for all types of write requests that are provided over WSV interface 302. For example, some special read-lockand-modify commands are used to retain exclusive, locked ownership of a cache line. When these types of commands are executed, the cache line will always be resident in cache memory 214 before a write request to the cache line is issued over primary interface 201. For this reason, pre-fetch control logic 304 does not generate an entry in GRA 300 when this type of write request is transferred over WSV interface 302, as is determined from the function code that is provided with the address.

In still another embodiment, pre-fetch control logic could be programmable to control the storing of any type of request addresses within GRA 300. In this embodiment, a user may enable pre-fetch processing for one or more other types of requests instead of, or in addition to, write requests. This may include enabling pre-fetching for one or more types of read operations, for example.

In another embodiment, pre-fetch control logic 304 includes re-synchronization logic 346 to resynchronize pre-fetch control logic when some types of commands are issued over WSV interface 302. As discussed above, pre-fetch control logic 304 includes read pointer 342 and write pointer 344, each pointing to a respective storage location within GRA 300. Read pointer 342 indicates the next request to be processed for pre-fetch purposes, and write pointer 344 indicates the GRA storage location that is to receive the next request. When both pointers point to the same location, GRA 300 is empty. One or more predetermined function code values may be defined to cause re-synchronization logic 346 to set the read pointer 342 to the storage location indicated by the write pointer 344. This effectively deletes all requests that were queued for pre-fetch processing, thereby re-synchronizing pre-fetch control logic 304.

The resynchronization logic described above may be useful for those situations wherein the processing of pre-fetch requests has fallen behind the processing of the associated write requests. In those cases, the pre-fetch processing is not providing any benefit, but instead is unnecessarily consuming the bandwidth of tag logic 212. Resynchronization restores the system to a state wherein pre-fetching may again enhance throughput.

From the foregoing discussion, it will be appreciated that if write stack 206 is empty, indicating that all write stack requests have been processed, and if the read and write pointers within pre-fetch control logic 304 do not point to the same GRA storage location, pre-fetching processing is lagging write request processing. This is so because if pre-fetch control logic 304 were "caught up", the read and write pointers would point to the same GRA storage location, indicating that all requests had been processed. Therefore, when write stack is known to be empty, an opportunity exists to resynchronize pre-fetch control logic 304 in the manner discussed in the foregoing paragraphs. Thus, in one embodiment, a signal is provided on WSV 302 to indicate when write stack 206 is empty to trigger the resynchronization process, if necessary.

In another embodiment of the invention, and for reasons that are beyond the scope of the current invention, IP 110A includes in its instruction set predetermined instruction types that may only be stored within write stack 206 when the write stack is otherwise empty. When the function codes values for these instruction types are detected by resynchronization logic 346 on WSV interface 302, the opportunity is utilized to resynchronize and, if necessary, adjust read pointer 342 in the manner discussed above.

Figure 4:
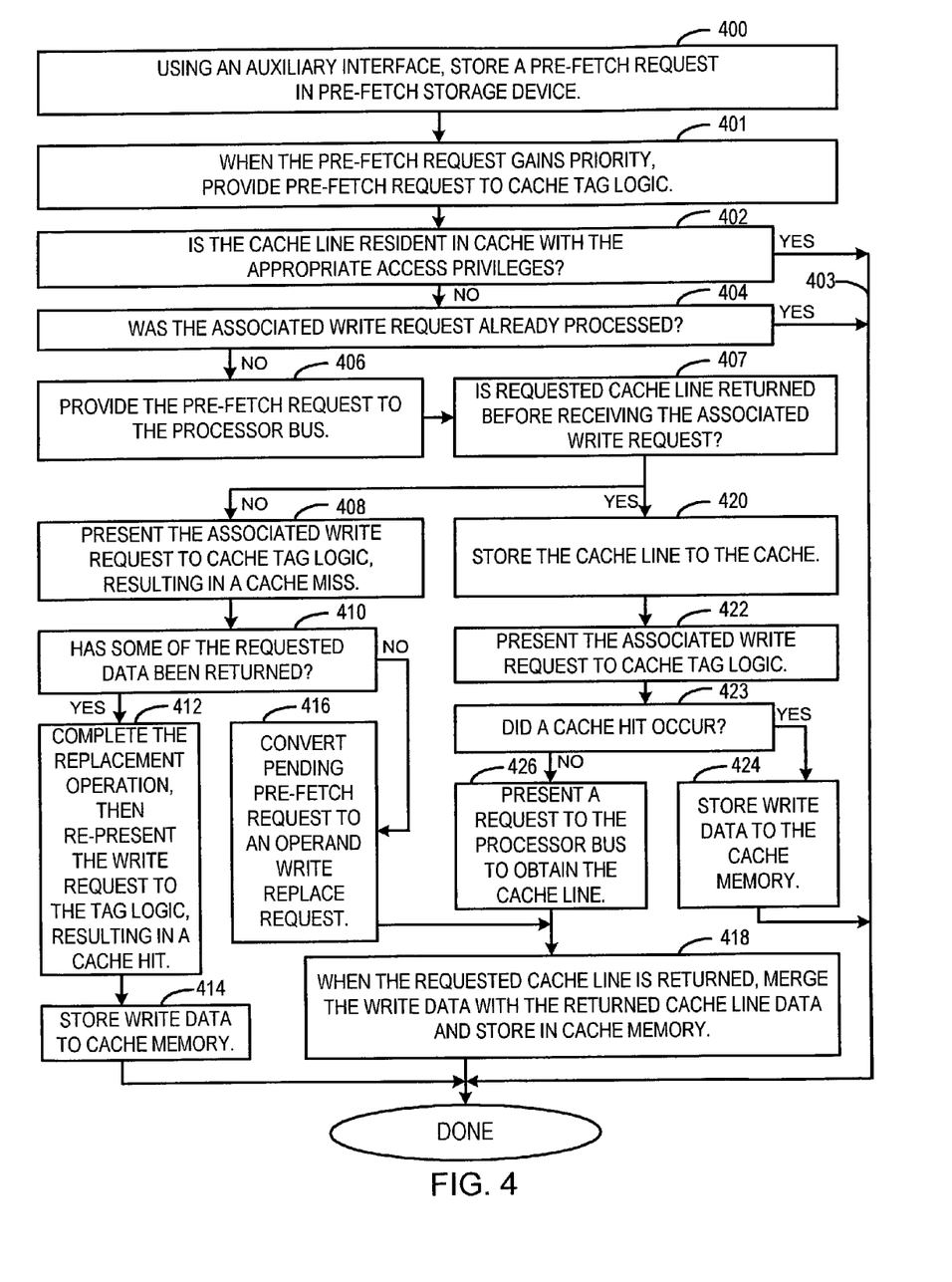
FIG. 4 is a flow diagram of one process according to the current invention.

FIG. 4 is a flow diagram illustrating one method of performing pre-fetching according to the current invention. Using an auxiliary interface that couples IP 110A to SLC 108A, a pre-fetch request is stored into a pre-fetch storage device (400). In FIG. 3, the auxiliary interface is shown as WSV interface 302, and GRA 300 is provided as the pre-fetch storage device. When the stored pre-fetch request gains priority, the request is provided to tag logic 212 (401). In the current embodiment, requests are processed in the order they are stored within GRA 300. Priority logic 208 determines when a request is presented to tag logic 212 based on a predetermined priority scheme that takes into account all requests that are pending to the cache.

If the cache line associated with the pre-fetch request is resident within cache memory 214 with the appropriate access privileges (402), the pre-fetch request may be considered complete as shown by arrow 403. Otherwise, bus priority logic 308 determines whether the associated write request was already processed by tag logic 212 such that a request for the cache line has already been generated (404). If so, processing of the current pre-fetch request is considered complete, as shown by arrow 403. In this case, bus priority logic 308 issues a resume signal to pre-fetch control logic 304, and processing is initiated on the next request that is scheduled for pre-fetch processing. Otherwise, the pre-fetch request is provided to the processor bus via BC 114A (406). In one embodiment, this is accomplished by writing the request to an available one of BRIL1 220 or BRIL 2 222 for presentation to the bus.

If the requested cache line is not returned prior to receiving the associated write request over primary interface 201 (407), the write request is presented to the cache tag logic, resulting in a cache miss (408). If some of the requested data has already been returned at this time (410), the replacement operation is allowed to complete. Then the original write request is re-presented as a stack request to the tag logic, resulting in a cache hit (412). The write data is stored to cache memory, and the operation is considered completed (414). Returning to decision step 410, if none of the requested data has been returned when the cache miss occurs, the pending pre-fetch request is converted to an operand write replace request (416). When the requested cache line is returned, the cache line data is merged with the write data, and the updated cache line is stored within the cache (418).

Returning now to decision step 407, if the requested cache line is returned before the associated write request is received, the cache line is stored to the cache memory (420). Sometime later, the associated write request is presented to the tag logic (422). If a cache hit occurs (423), the write data is stored to the cache memory, and the operation is considered complete (424). Otherwise, if a cache miss occurs, the pre-fetched cache line was snooped away before the write request was presented to the cache memory. In this case, the write request is presented to the processor bus to obtain the cache line (426). When the requested cache line is returned, the write data is merged with the cache line data and stored to the cache memory (418).

Figure 5:
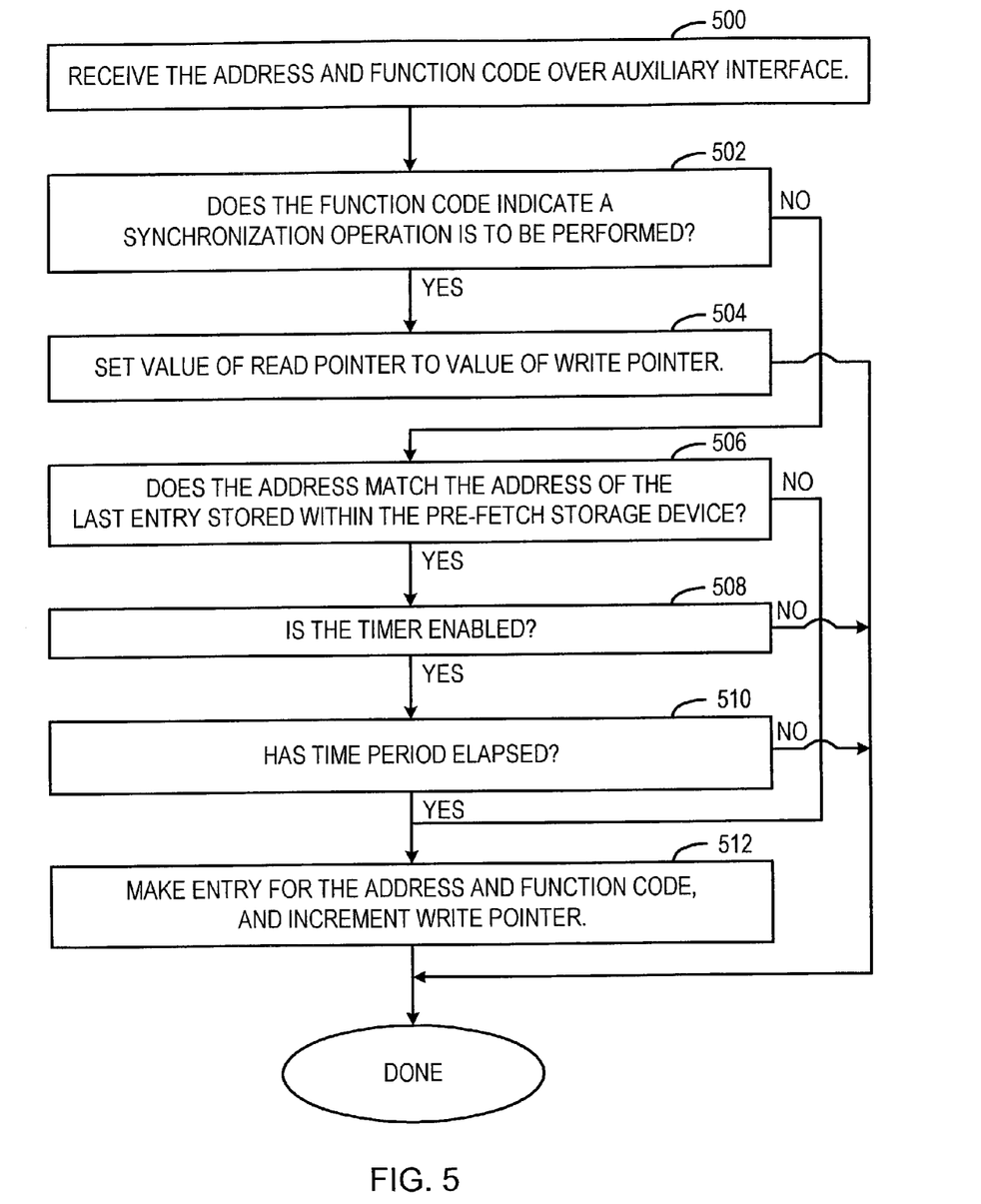
FIG. 5 is a flow diagram illustrating one method of entering addresses into the pre-fetch storage device according to the current invention.

FIG. 5 is a flow diagram illustrating one method of entering addresses into the pre-fetch storage device according to the current invention. This storage device is shown as GRA 300 of FIG. 3. First, a request address and function code are received over the auxiliary interface, which is shown as WSV interface 302 of FIG. 3 (500). If the function code is a predetermined value indicating a synchronization operation is to be performed (502), the value of the read pointer is set to the value of the write pointer (504), and the operation is complete. As noted above, the function code signal may also be used to selectively enable the storing of the associated address within the pre-fetch storage device.

If the function code is not one of the predetermined values, it is determined whether the current address has a predetermined relationship to the address of the last entry stored within the pre-fetch storage device (506). In the current embodiment, this relationship is "equal to", although other relationships could be utilized in other embodiments. In the current embodiment, if the current address does not match the address of the most recently stored entry, the current address and function code are stored within the pre-fetch storage device, and the write pointer is incremented (512). If the predetermined address relationship does exist, it is determined whether the timer is enabled (508). If not, the current address is not entered into the pre-fetch storage device, since this will result in duplicate pre-fetch requests for the same cache line. If the timer is being used, it is determined whether a predetermined time period has elapsed (510). If so, an entry is made into the pre-fetch storage device (512) even if the current address matches the address of the most recently stored entry, since enough time has elapsed that any previously pre-fetched cache line may have been snooped away. Therefore, it is considered desirable to process the address again for pre-fetch purposes. Any or all of the modes illustrated within FIG. 5 may be programmable using scan logic 330.

It will be appreciated that many alternative embodiments of the foregoing system and method are possible within the scope of the current invention. For instance, the exemplary system discussed above focused on the processing of write requests. A similar system may be used to process read requests. For example, pre-fetch control logic may be programmed in the manner discussed above to enable pre-fetch processing for read and/or other types of requests. In another embodiment, any number of ports may be provided to perform pre-fetching so that more than two pre-fetch requests may be pending at a given time to processor bus 104A. Moreover, the inventive system and method may be adapted for any kind of multi-processor environment, with the above-described data processing architecture being set forth for discussion purposes only. Thus, the above-described embodiments are to be considered exemplary only, with the scope of the invention being indicated only by the claims that follow, rather than by the foregoing description.

What is claimed is:

1. For use in a data processing system having at least one Instruction Processor (IP), a cache memory, and at least one other memory, a system for utilizing the cache memory, comprising:
   a primary interface coupling the IP to the cache memory to provide requests from the IP to the cache memory; and
   an auxiliary interface coupling the IP to the cache memory to provide an address to the cache memory, whereby a pre-fetch operation is initiated to obtain from the at least one other memory data signals identified by the address if the data signals are not stored in the cache memory.

2. The system of claim 1, wherein the primary interface is capable of providing a request to the cache memory while the address is provided on the auxiliary interface.

3. The system of claim 1, and further including a write stack storage device coupled to the primary Interface to store the requests that will be provided over the primary interface.

4. The system of claim 3, and further including decode logic coupled to the storage device to decode one or more executable instructions, ones of the executable instructions to cause a respective request to be stored in the write stack storage device.

5. The system of claim 4, wherein the decode logic includes circuitry to continue decoding subsequent executable instructions while the requests are provided to the cache memory over the primary interface.

6. The system of claim 5, wherein each request includes a respective address, and wherein the decode logic is coupled to the auxiliary interface to provide each of the respective addresses to the auxiliary interface, each of the addresses to be provided to the cache memory to initiate a pre-fetch operation if the data signals identified by the address are not stored in the cache memory.

7. The system of claim 2 wherein the auxiliary interface is coupled to pre-fetch logic to control providing the address to the cache memory.

8. The system of claim 7, wherein the pre-fetch logic is coupled to a storage device that stores the address before it is provided to the cache memory.

9. The system of claim 8, wherein the storage device includes circuits to store multiple addresses provided over the auxiliary interface, the pre-fetch logic to control providing each address to the cache memory so that a respective pre-fetch operation may be initiated if data signals identified by the address are not stored in the cache memory.

10. The system of claim 9, and further including bus priority logic coupled to the pre-fetch logic to initiate each pre-fetch operation.

11. The system of claim 10, wherein the bus priority logic includes circuits to allow multiple pre-fetch operations to be pending simultaneously.

12. The system of claim 11, and further including cache control logic coupled to the bus priority logic to control the storing to the cache memory of the data signals that are returned as a result of any of the multiple pre-fetch operations, the storing of the data signals to be completed irrespective of the order the multiple pre-fetch operations were initiated.

13. The system of claim 11, wherein the bus priority logic includes a programmable mode switch to control the rate of initiating the multiple pre-fetch operations.

14. The system of claim 13, wherein the programmable mode switch includes circuits to provide a programmable mode to correlate the rate of initiating the multiple pre-fetch operations to the rate the requests are provided by the IP over the primary interface.

15. The system of claim 11, wherein each address is provided with respective function signals, and wherein the programmable mode switch includes circuits to control the rate of issuing the multiple pre-fetch operations based on the respective function signals.

16. The system of claim 10, wherein the address identifies a cache line of data signals, and wherein the request interface logic includes circuits to initiate retrieval of the cache line of data signals if the cache line is not stored in the cache memory.

17. The system of claim 10, wherein ones of the requests provided over the primary interface are write requests to store data in the cache memory.

18. The system of claim 17, and further including a merge circuit coupled to the cache memory to merge data provided with one of the write requests with the data signals obtained during a respective pre-fetch operation, wherein the merged data is then written to the cache memory.

19. The system of claim 9, wherein the pre-fetch logic includes a filter to prevent predetermined addresses provided over the auxiliary interface from being stored within the storage device.

20. The system of claim 19, wherein the filter includes circuits to prevent an address from being stored within the storage device if the address matches an address most recently stored to the storage device.

21. The system of claim 11, and further including:
a memory interface to couple the cache memory to the at least one other memory; and
multiple ports, each coupled to the bus priority logic to provide a pre-fetch request to the memory interface for a respective one of the simultaneously pending pre-fetch operations.

22. The system of claim 7, wherein function signals may be transmitted over the auxiliary interface, and wherein the pre-fetch logic includes resynchronization logic to resynchronize the pre-fetch logic when the function signals are set to one or more predetermined values.

23. In a system including an instruction processor (IP) coupled to a cache and a storage device over a primary interface and an auxiliary interface, a method of utilizing the cache comprising:
a.) providing an address from the IP to the cache via the auxiliary interface to determine whether addressed data is resident in the cache, and if not, to initiate retrieval of the addressed data from the storage device; and
b.) providing an access request from the IP via the primary interface to access the cache.

24. The method of claim 23, wherein steps a.) and b.) are performed simultaneously.

25. The method of claim 23, and further comprising issuing a pre-fetch request to obtain the addressed data if the addressed data is not resident in the cache.

26. The method of claim 25, and further including repeating steps a.) and b.) multiple times to provide multiple addresses and multiple access requests to the cache.

27. The method of claim 26, and further comprising issuing, for each of predetermined ones of the addresses, a respective pre-fetch request, and wherein multiple pre-fetch requests may be pending simultaneously.

28. The method of claim 27, and including controlling the rate at which the multiple pre-fetch requests are issued.

29. The method of claim 28, and including controlling the rate at which the multiple pre-fetch requests are issued based on the rate at which the multiple access requests are provided.

30. The method of claim 28, and including waiting to receive one of the multiple access requests that is associated with one of the multiple pre-fetch requests before issuing another pre-fetch request.

31. The method of claim 27, and further including:
obtaining addressed data for one of the multiple pre-fetch requests; and
writing the addressed data for the one of the multiple pre-fetch requests to the cache irrespective of the order in which the multiple pre-fetch requests were issued.

32. The method of claim 25, and further including:
obtaining the addressed data;
storing the addressed data within the cache memory;
receiving write data with the access request via the primary interface; and
storing the write data in the cache memory.

33. The method of claim 25, and further including:
obtaining the addressed data;
receiving write data with the access request via the primary interface;
merging the addressed data with the write data; and
storing the merged data to the cache memory.

34. The method of claim 23, and further including disregarding the address if the address has a predetermined relationship to the address that was most recently received via the auxiliary interface.

35. The method of claim 33, and further including disregarding the address only if a predetermined time period has elapsed between the time the address is received and the time the last address was received via the auxiliary interface.

36. The method of claim 23, and including:
decoding an instruction;
generating the access request; and
temporarily storing the access request within a second storage device until
the access request may be provided to the cache via the primary interface.

37. The method of claim 36, and further including allowing the IP to decode additional instructions without regard to the completion of the access request over the primary interface.

38. The method of claim 25, wherein step a.) includes:
storing the address;
scheduling the address for presentation to the cache based on a predetermined priority scheme; and
presenting the address to the cache to determine whether the addressed data is resident in the cache.

39. The method of claim 38, wherein step b.) includes scheduling the access request for presentation to the cache based on the predetermined priority scheme, and whereby the access request is granted higher priority than the address.

40. The method of claim 39, and including repeating steps a.) and b.) for multiple requests.

41. The method of claim 40, and further including performing resynchronization so that step a.) is being performed on an address that is included in the access request.

42. In a data processing system including an Instruction Processor (IP) coupled to a cache memory and a storage device, a system for processing requests, comprising:
a decode circuit within the IP for generating the requests, each including an address;
pre-fetch logic coupled to the decode circuit to determine whether predetermined ones of the addresses are resident within the cache memory;
request interface logic coupled to the pre-fetch logic to obtain from the storage device data addressed by each of the predetermined ones of the addresses that are not resident within the cache memory; and
cache control logic coupled to the request interface logic to write obtained data to the cache memory irrespective of the order in which the requests were generated.

43. The system of claim 42, wherein a primary interface couples the IP to the cache memory to provide the requests from the IP to the cache memory, and further including an auxiliary interface to couple the decode circuit to the pre-fetch logic.

44. The system of claim 43, wherein the request interface logic includes multiple ports, each capable of issuing a respective pre-fetch request to obtain data addressed by one of the predetermined ones of the addresses that are not resident within the cache memory.

45. The system of claim 44, wherein the request interface logic includes circuit to allow multiple pre-fetch requests to be pending simultaneously.

46. The system of claim 43, and further including interface control logic coupled to the primary interface to provide a request over the primary interface at the same time an address is provided over the auxiliary interface.

47. A method of utilizing a cache memory that is coupled to a primary interface, an auxiliary interface, and a storage device, comprising:
- a.) generating one or more requests via the primary interface to access the cache memory, each request including an address;
- b.) scheduling the requests for processing by the cache memory;
- c.) independently of step b.), determining whether addresses received via the auxiliary interface are resident within cache memory; and
- d.) for each address that is not resident within the cache memory, obtaining data from the storage device and writing data addressed by the address to the cache memory.

48. The method of claim 47, wherein the cache memory is coupled to an instruction processor over the primary interface and the auxiliary interface.

49. A system for using a cache that is coupled to an instruction processor and a memory, comprising:
- primary interface means for providing requests from the instruction processor, ones of the requests to access a respective address within the cache; and
- pre-fetch means operating independently of, and simultaneously with, the primary interface means for determining whether the respective addresses are resident within the cache, and if not, for retrieving from the memory data stored at the respective addresses.

50. The system of claim 49, and further including auxiliary interface means for providing the respective addresses from the instruction processor the cache independently of the primary interface means.

* * * * *